(12) United States Patent
Hiramatsu

(10) Patent No.: US 6,427,740 B1
(45) Date of Patent: Aug. 6, 2002

(54) PROTECTIVE COATING FOR THE TIRE SIDEWALLS

(75) Inventor: Koji Hiramatsu, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/503,084

(22) Filed: Feb. 14, 2000

(30) Foreign Application Priority Data

Feb. 15, 1999  (JP) ............................................. 11-036224

(51) Int. Cl.$^7$ ............................... B60C 5/00; C08K 3/00
(52) U.S. Cl. ............... 152/450; 152/524; 152/DIG. 12; 524/523; 524/524; 525/330.3
(58) Field of Search ................................. 152/524, 525, 152/450; 524/503, 501, 502, 523, 524

(56) References Cited

U.S. PATENT DOCUMENTS

| | | | | |
|---|---|---|---|---|
| 5,049,609 A | * | 9/1991 | Patitas ........................ | 524/386 |
| 5,837,076 A | * | 11/1998 | Huber et al. ................. | 152/524 |
| 5,977,239 A | * | 11/1999 | Chauffour et al. .......... | 524/492 |
| 5,981,646 A | * | 11/1999 | Huber et al. ................. | 524/503 |
| 6,124,044 A | * | 9/2000 | Swidler ....................... | 428/500 |

* cited by examiner

Primary Examiner—Edward J. Cain
Assistant Examiner—Katarzyna W. Lee
(74) Attorney, Agent, or Firm—Wenderoth, Lind & Ponack, L.L.P.

(57) ABSTRACT

Coating composition for forming a protective film of a colored rubber portion of a tire sidewall and a protective film formed thereby are provided whereby contamination of a colored rubber portion is effectively prevented when transporting or storing tires without troublesome operation such as peeling and removing a film. Such coating composition comprises at least one resin with polymerization degree 200 and above selected from the group consisting of polyvinyl acetate resin, specific vinyl acetate copolymer resin and polyvinyl alcohol, and at least one solvent selected from the group consisting of lower alcohol, water and any combination thereof, a solution viscosity being 300 cps–1000 cps.

4 Claims, No Drawings

PROTECTIVE COATING FOR THE TIRE SIDEWALLS

BACKGROUND OF THE INVENTION

1. Field of the Invention

This invention relates to a coating composition for forming a protective film of a colored rubber portion of a tire and a protective film produced thereby, and more specifically to a coating composition for forming a protective film of a colored rubber portion having a different color(almost white) from a base color(black) of a sidewall portion of a tire and a protective film formed thereby.

2. Prior Art

Conventionally, on a sidewall of a tire, there have been sometimes arranged ornaments made of white rubber and the like in order to add beauty to a tire, along a sidewall portion of a tire, such as a circular line or letters representing a tire manufacturing company. Such tires are so-called white-line tires, white-letter tires, etc. When transporting or storing such tires in a pile, however, there often occur such problems that a colored rubber portion of a tire is contaminated or discolored due to antioxidants, process oil and the like bleeding from adjoining tires, also due to dust and refuse attached with adjoining tires, and that a colored rubber portion of a tire is likely to be damaged due to the contact of tires with each other.

In order to solve the above problems, the following measures have been taken:

1) wrapping a whole tire with synthetic papers and the like;
2) applying a soft plastic film to the colored rubber portion; and
3) coating a colored rubber portion with water-soluble paint, e.g., blue-colored paint, to form a thin film.

Wrapping a tire as in measure 1) is time-consuming and synthetic papers used for wrapping yield industrial wastes. In the case of the above measure 2), adhesives coated to a soft plastic film increase its viscosity at a low temperature, and as a result the peel strength also becomes greater. Accordingly, peeling operation was not easily conducted before using such a tire. Even if peeling operation is done at a room temperature or comparatively high temperature, adhesives tend to remain on the surface of the colored rubber portion after completion of film peeling, which spoils the beauty of tires. Peeled films should also be disposed as industrial wastes.

According to the above measure 3), it is necessary to remove a thin film of colored water-soluble paint from a colored rubber portion using water or the like before using a tire, so that a colored rubber portion on the sidewall is maintained with its beauty. However, such washing operation is time-consuming and a thinner film is required for easy removability. A thinner film, however can not enhance properties of preventing contamination and damages of a colored rubber portion.

SUMMARY OF THE INVENTION

It is therefore an object of the present invention to provide a coating composition for forming a protective film of a colored rubber portion of a tire sidewall to maintain a color at a colored portion with its beauty and a protective film produced thereby wherein the above-described contamination and damages can be fully prevented without troublesome operation such au peeling and removing a film or disposing industrial wastes.

The inventor has made various investigations for attaining the above mentioned objects and as a result, it has been found out that a film made of specific resins which are soluble by water or lower alcohol is colorless and transparent and has satisfactory tenacity required for a protective film and is easy to handle since water and lower alcohol can be used as a solvent.

Thus, the present invention provides, as claimed in claim 1, a coating composition for forming a protective film of a colored rubber portion of a tire comprising at least one resin with polymerization degree 200 and above selected from the group consisting of polyvinyl acetate resin, vinyl acetate-acrylic acid copolymer resin, vinyl acetate-methacrylic acid copolymer resin, vinyl acetate-alkane acid copolymer resin, vinyl acetate-itaconic acid copolymer resin, vinyl acetate-crotontc acid copolymer resin, vinyl acetate-fumaric acid copolymer resin, vinyl acetate-maleic acid copolymer resin, vinyl acetate-maleic anhydride copolymer resin and polyvinyl alcohol, and at least one solvent for dissolving resins selected from the group consisting of lower alcohols and water, wherein a solution obtained having 30 cps–1,000 cps viscosity.

Any lower alcohol which is liquid at a room temperature is applicable to the present, invention. Methanol, ethanol, propyl alcohol, isopropyl alcohol, butyl alcohol, isobutyl alcohol are preferable, and particularly methanol and ethanol are more preferable. Water and lower alcohols are applicable separately or in a mixed form of water and at least one of lower alcohols or in a mixed form of at least two lower alcohols. Preferable solvents nay be selected in consideration of solubility of resins and a solution viscosity.

Taking into account of a drying speed after coating, it is preferable to use lower alcohol with lower boiling temperature separately. e.g., methanol or ethanol. Solvent having a higher boiling temperature such as water may be mixed with lower alcohols having a lower boiling temperature.

Polyvinyl acetate resin, vinyl acetate-acrylic acid copolymer resin, vinyl acetate-methacrylic acid copolymer resin, vinyl acetate-alkane acid copolymer resin, vinyl acetate-itaconic acid copolymer resin, vinyl acetate-crotonic acid copolymer resin, vinyl acetate-fumaric acid copolymer resin, vinyl acetate-maleic acid copolymer resin, vinyl acetate-maleic anhydride copolymer resin, and polyvinyl alcohol can be applied separately or in a mixed form of at least two thereof. The polymerization degree shall be not less than 200. When the polymerization degree of a resin is less than 200, the tenacity of a formed protective film is not satisfactory and a protective film is inferior in durability and stability, thus resulting in rupture of the protective film during transporting or storing of tires. Then properties of preventing contamination and damages of a colored rubber portion are injured.

The viscosity of solution including one or two resins dissolved in the solvent shall be 30 cps–1,000 cps by measurement at 25° C. using a SB type viscometer in accordance with a rotational viscometer method described in the Japanese Industrial Standard—JIS K 5400 (hereinafter same measuring method is applied to measure solution viscosity). When the solution viscosity is less than 30 cps, a protective film obtained can not fully perform such functions as preventing contamination and damages. On the other hand, when the solution viscosity is more than 1,000 cps, uniform coating of the protective film is difficult. Preferable solution viscosity is 200 cps–600 cps.

A coating composition obtained has the following characteristics: 1) each resin component is easily dissolved into the above mentioned solvent or mixed solvent and a coating composition is easily manufactured; 2) coating operation onto a colored rubber portion is easily conducted by means of spray coating or brushing; 3) water or lower alcohol is used as solvent, so that easy and fast drying is performed after coating and rubber components of a tire are not damaged by a coating composition and besides no environmental pollution occurs; and 4) a protective film formed with such composition is colorless and transparent and has preferable tenacity.

The present invention also provides, as claimed in claim 2, a protective film formed on the colored rubber portion of a tire using the above coating composition claimed in claim 1. A protective film thus obtained is colorless and transparent and has superior tenacity, so that the function of a protective film such as preventing contamination and damages can be fully performed while maintaining a colored rubber portion with its beauty. As a result, the protective film according to the present invention requires no troublesome operations such as wrapping a tire and removing a wrap, applying and peeling a plastic film or removing a thin film of colored water-soluble paint as described in connection with the prior arts. Furthermore, there yields no wastes to be disposed.

The thickness of a protective film is preferably 15 μm–100 μm, as claimed in claim 3. When the thickness is less than 15 μm, the effect of preventing contamination and damages is inferior. On the other hand, when the thickness is more than 100 μm, there tends to occur cracks on a protective film. Thickness of a protective film is preferably 20 μm–70 μm.

DESCRIPTION OF THE PREFERRED EMBODIMENTS

The present invention is now explained with the following embodiments.

Embodiment 1

One of preferable coating compositions for forming a protective film of a colored rubber portion of a tire was obtained by dissolving polyvinyl acetate resin or any one of aforementioned vinyl acetate copolymer resins having a polymerization degree 200–5000 into a mixed solvent comprising methanol, ethanol and water with the solution viscosity of 200 cps–600 cps.

The coating composition obtained was coated by means of spray coating on a white circle line on a side wall portion of a tire By natural drying, a colorless and transparent protective film of high tenacity was obtained with the thickness of 20 μm–70 μm.

Embodiment 2

Another preferable coating compositions for forming a protective film of a colored rubber portion of a tire was obtained by dissolving polyvinyl alcohol having a polymerization degree 200–5000 into water with the solution viscosity of 200 cps–600 cps.

The coating composition obtained was coated by means of brushing on a white circle line on a tire side wall portion. By natural drying, a colorless and transparent protective film of high tenacity was obtained with the thickness of 20 μm–70 μm.

Both in the above embodiments, easy coating and easy and speedy drying are performed. The protective film obtained was colorless and transparent and of high tenacity, so that contamination or damages of a white circle line on a sidewall portion caused by contact with adjoining tires when transporting or storing was fully prevented, while keeping the white circle line with its beauty.

EXAMPLES

Further explanations will be made with reference to the following examples.

Example 1

Coating composition for forming a protective film of a colored rubber portion of a tire was prepared by dissolving vinyl acetate-crotonic acid copolymer resin of polymerization degree 300 into a mixed solvent comprising methanol, ethanol and water with a component ratio as shown in Table 1.

Namely, 20 wt % of vinyl acetate-crotonic acid copolymer resins were mixed and stirred with a mixed solvent comprising 50 wt % of methanol, 20 wt % of ethanol and 10 wt % of water. Said resins were easily dissolved and a coating composition was obtained. Next, said coating composition was coated using a pressurized spray gun on a colored portion, i.e. white circle line of a white line tire(tire size: P195/75R14 92S) having a white circle line of about 17 mm width arranged on the sidewall portion. By natural drying, a protective film was obtained.

Evaluation of the coating composition was made in connection with solution viscosity, uniform coating performances, drying performances and evaluation of the protective film was made in connection with thickness, contamination preventing performances, anti-peeling and cracking performances. The results are shown in Table 1.

Example 2

A coating composition and a protective film were prepared in the same manner as described in Example 1 with the exception that polyvinyl alcohol of polymerization degree 300 was used as resin and water was used as solvent with a component ratio as shown in Table 1. The results of evaluation of the coating composition and the protective film are as shown in Table 1.

Example 3

A composition and a protective film were prepared in the same manner as described in Example 1 with the exception that 25 wt % of vinyl acetate-crotonic acid copolymer resin of polymerization degree 300 and 15 wt % of ethanol were used as shown In Table 1. The results of evaluation are shown in Table 1.

Comparative Example 1

Used as Comparative Example 1 was a white-line tire having the same tire size of P195/75R14 92S with Example 1 and no protective film on the colored rubber portion, i.e. white line portion.

Comparative Example 2

A coating composition for forming a protective film of a colored rubber portion of a tire was prepared in the same manner as described in Example 1 with the exception that vinyl acetate-crotonic acid copolymer resins of polymerization degree 300 were used as resin and mixed solvent comprising methanol, ethanol and water was used as solvent with a component ratio as shown in Table 1.

Next, said coating composition was coated using a pressurized spray gun on a colored portion, i.e. white circle line of a white line tire of P195/75 R14 92S having a white circle line of about 17 mm width arranged on the sidewall portion. Coating and natural drying were repeated several times(so called multi-coating) and a protective film with the thickness of 40 μm was obtained. The results of evaluation are shown in Table 1.

Comparative Examples 3, 4 and 5

A coating composition for forming a protective film of a colored rubber portion of a tire was prepared in the same manner as described in Example 1 with the exception that vinyl acetate-crotonic acid copolymer resins of polymerization degree 300 were used as resin and mixed solvent comprising methanol, ethanol and water was used as solvent with a component ratio as shown in Table 1. The results of evaluation are shown in Table 1.

The coating compositions and protective films were evaluated by the following evaluating methods.

(1) Uniform Coating Performance:

Coating condition after applying was evaluated by visual inspection as to the coating compositions in Examples 1–3 and Comparative Examples 2–5.
- ○: uniformly coated
- Δ: coated partly thicker or thinner
- ×: non-uniformity of thickness observed as a whole and some parts remained uncoated (2) Drying Performance:

A tire coated with the coating composition was dried at 60° C. using an oven and evaluated by drying speed.
- ○: resin did not adhere to fingers when touched with hands within 5 minutes after coating
- Δ: resin did not adhere to fingers when touched with hands within 5–10 minutes after coating
- ×: 10 minutes or more were taken before resin did not adhere to fingers (3) Thickness of the Protective Film:

The thickness of the protective film was observed with the magnification 50 using a film thickness measuring apparatus (a zoom stereo microscope manufactured by Nikon Corporation).

(4) Contamination Prevention:

Tires in Examples 1–3 and Comparative Examples 1–5 were loaded into a container in an ordinary manner, and shipped to the United States. In USA site, the contamination of the colored rubber portion (white line portion) was observed by visual inspection.
- ○: no contamination observed
- ×: contamination observed (5) Cracking and Peeling:

Tires in Examples 1–3 and Comparative Examples 2–5 were loaded into a container in an ordinary manner, and shipped to the United States. In USA site, cracking and peeling of the protective film was observed by visual inspection.
- ○: no cracking and peeling observed
- ×: cracking and peeling observed

TABLE 1

|  | Comparative Examples |  |  |  |  | Examples |  |  |
|---|---|---|---|---|---|---|---|---|
|  | 1 | 2 | 3 | 4 | 5 | 1 | 2 | 3 |
| Resin (wt %) |  |  |  |  |  |  |  |  |
| vinyl acetate-crotonic acid copolymer resin | — | 9 | 20 | 26 | 27 | 20 | — | 25 |
| polyvinyl alcohol resin | — | — | — | — | — | — | 20 | — |
| Solvent (wt %) |  |  |  |  |  |  |  |  |
| methanol | — | 50 | 50 | 50 | 50 | 50 | — | 50 |
| ethanol | — | 31 | 20 | 14 | 13 | 20 | — | 15 |
| water | — | 10 | 10 | 10 | 10 | 10 | 80 | 10 |
| Properties of the composition |  |  |  |  |  |  |  |  |
| solution viscosity (cps) | — | 20 | 350 | 1100 | 1650 | 350 | 320 | 940 |
| uniform coating performance | — | ○ | ○ | Δ | × | ○ | ○ | ○ |
| drying performance | — | ○ | ○ | Δ | × | ○ | ○ | ○ |
| Properties of the protective film |  |  |  |  |  |  |  |  |
| protective film | nil | coated | coated | coated | coated | coated | coated | coated |
| film thickness (μm) | — | 40 | 9 | 90 | 174 | 34 | 32 | 35 |
| contamination prevention | × | × | × | × | × | ○ | ○ | ○ |
| cracking/peeling | — | × | ○ | × | × | ○ | ○ | ○ |

As shown in Table 1, the coating compositions of Examples 1–3 are superior in uniform coating performance and drying performance and coating operation performance. The protective films obtained are superior in contamination prevention performance and have superior tenacity. Namely, as shown in Table 1, even when tires coated with the protective films were loaded into a container and shipped to the United States, there occurred no contamination on the white line portion of tires and no crackings and peeling of the protective films.

The tire in Comparative Example 1 having no protective film yields contamination on the white line portion of tires as apparent from the evaluating results shown in Table 1.

In Comparative Example 2, the solution viscosity of the coating composition is remarkably low. In order to make the film thickness larger, multi-coating was conducted. However, there occurred cracking and peeling, resulting in the contamination of the white line portion. In Comparative Example 3, the solution viscosity of the coating composition is preferable, but the film thickness is not fully satisfactory, so that there found contamination on the white line portion.

In Comparative Examples 4 and 5, the solution viscosity of the composition is so high that uniform coating Is difficult. As a result, there occurred such defects that some portion was coated thicker, some portion thinner and some portion remains uncoated. Accordingly, drying operation takes a long time and after shipping to the United States, crackings and peeling were observed and the contamination on the white line portion was also observed.

As explained heretofore, according to the present invention, the coating composition for forming a protective film of a colored rubber portion of a tire has the following merits.

1) Each resin components are easily soluble by water or lower alcohols, so that the coating composition is easily prepared.
2) Coating is easily performed by means of spray coating or brushing;
3) Water or lower alcohols are used as solvent, so that the drying performance after coating is superior and there occurs no such problems that tire rubber components are damaged by the coating composition and environmental pollution occurs.

The protective film using the above coating composition is colorless and transparent and has superior tenacity, so that the function of a protective film such as preventing contamination and damages can be fully performed while maintaining a colored rubber portion with its beauty.

As a result, the protective film according to the present invention requires no troublesome operations such as wrapping a tire and removing a wrap, applying and peeling a plastic film or removing a thin film of colored water-soluble paint as described in connection with the prior arts. Furthermore, there yields no wastes to be disposed.

What is claimed is:

1. A coating composition for forming a protective film over a colored rubber portion of a tire, comprising at least one resin with a polymerization degree of 200 and above selected from the group consisting of vinyl acetate-acrylic acid copolymer resin, vinyl acetate-methacrylic acid copolymer resin, vinyl acetate-alkane acid copolymer resin, vinyl acetate-itaconic acid copolymer resin, vinyl acetate-crotonic acid copolymer resin, vinyl acetate-fumaric acid copolymer resin, vinyl acetate-maleic acid copolymer resin, and vinyl acetate-maleic anhydride copolymer resin, and a mixed solvent comprising methanol, ethanol and water, wherein the composition has a solution viscosity of 30 cps–1,000 cps.

2. A protective film formed on the colored rubber portion of a tire using the coating composition as claimed in claim 1.

3. The protective film according to claim 2, wherein the thickness of the protective film is 15 $\mu$m–100 $\mu$m.

4. A tire comprising a tire body including a colored rubber portion having a protective film formed over said portion made from the coating composition as claimed in claim 1.

* * * * *